United States Patent
Shukla et al.

(10) Patent No.: US 9,975,101 B2
(45) Date of Patent: May 22, 2018

(54) PROCESS FOR PREPARATION OF SELF HEALING MICROCAPSULES

(71) Applicant: Council of Scientific and Industrial Research, New Delhi (IN)

(72) Inventors: Parshuram Gajanan Shukla, Pune (IN); Arun Savalaram Jadhav, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 72 days.

(21) Appl. No.: 15/165,522

(22) Filed: May 26, 2016

(65) Prior Publication Data

US 2016/0346753 A1 Dec. 1, 2016

(30) Foreign Application Priority Data

May 26, 2015 (IN) ............................ 1495/DEL/2015

(51) Int. Cl.

| | |
|---|---|
| *B01J 13/18* | (2006.01) |
| *C09J 9/00* | (2006.01) |
| *C09J 163/00* | (2006.01) |
| *B01J 13/14* | (2006.01) |
| *C08G 59/18* | (2006.01) |

(52) U.S. Cl.
CPC ............ *B01J 13/185* (2013.01); *B01J 13/14* (2013.01); *C08G 59/188* (2013.01); *C09J 163/00* (2013.01)

(58) Field of Classification Search
CPC ....... B01J 13/14; B01J 13/185; C08G 59/188; C09J 163/00
See application file for complete search history.

(56) References Cited

U.S. PATENT DOCUMENTS

| | | |
|---|---|---|
| 5,859,075 A | 1/1999 | Shukla et al. |
| 5,962,003 A | 10/1999 | Shukla et al. |
| 2006/0251688 A1 | 11/2006 | Gajanan et al. |
| 2013/0072596 A1* | 3/2013 | White ............... C08L 75/04 523/456 |

FOREIGN PATENT DOCUMENTS

| | | |
|---|---|---|
| WO | WO-2014/194600 | 12/2014 |
| WO | WO-2015/074342 | 5/2015 |

OTHER PUBLICATIONS

Macromolecules 2008, 41, 9650-55, Microencapsulation of Isocyanates for Self-Healing Polymers, Jinglei Yang et al.*
Polymer, 50, 2009, 990-97, Microcapsules filled with reactive solutions for self-healing materials, B.J. Blaiszik et al.*
Experimental Mechanics, 42, 4, 2002 372-79, Fracture Testing of a Self-Healing Polymer Composite, E.N. Brown et al.*
Adv. Functional Mater. 2008, 18, 44-52, Autonomic Healing of Epoxy Vinyl Esters via Ring Opening Metathesis Polymerization, Wilson et al.*
Liao, Leping, et al., "Preparation and characterization of microcapsule containing epoxy resin and its self-healing performance of anticorrosion covering material", Chinese Science Bulletin, vol. 56, No. 4-5, Feb. 2011, 439-443, (Feb. 2011), 439-443.

* cited by examiner

*Primary Examiner* — Irina S Zemel
(74) *Attorney, Agent, or Firm* — Schwegman Lundberg & Woessner, P.A.

(57) ABSTRACT

The present invention disclosed a process for the preparation of microcapsules containing epoxy resin which comprises water-insoluble and/or water-soluble components prepared by in-situ polymerization using non-aqueous continuous phase which acts as healing agents for the micro-cracks when embedded in composite structures.

10 Claims, 4 Drawing Sheets

| FIGURE 1(a) | FIGURE 1(b) |
|---|---|
| 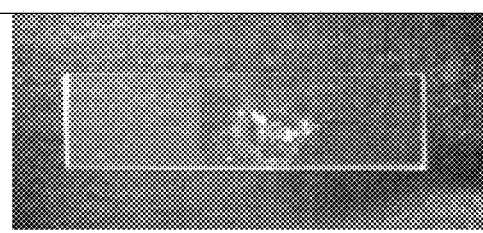 | 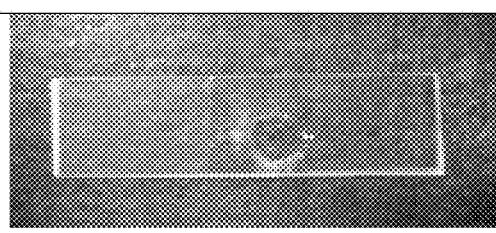 |
| FIGURE 1(c) | FIGURE 1(d) |
| 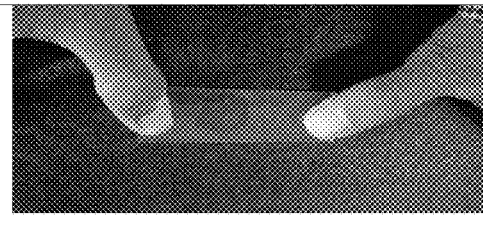 | 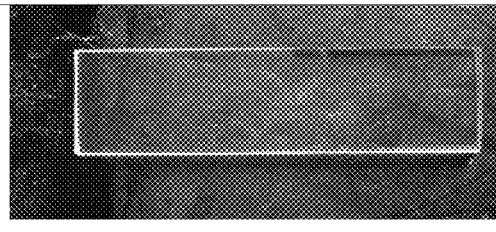 |

PROCESS FOR PREPARATION OF SELF HEALING MICROCAPSULES

CLAIM OF PRIORITY

This application claims the benefit of priority of India Patent Application No. 1495/DEL/2015, filed on 26 May 2015, the benefit of priority of which is claimed hereby, and which is incorporated by reference herein in its entirety.

FIELD OF THE INVENTION

The present invention relates to a process for the preparation of self-healing microcapsules containing epoxy resin. More particularly, the present invention relates to a process for the preparation of microcapsules containing epoxy resin comprising water-insoluble or water-soluble components or mixture thereof.

BACKGROUND AND PRIOR ART OF THE INVENTION

Composite materials are the materials made of two or more constituent materials that include composite building materials such as cements, concrete; reinforced plastics such as fiber-reinforced polymer; ceramic composites; metal composites, etc. These composite materials are generally used for buildings, bridges and structures, such as boat hulls, race car bodies, spacecraft, etc. All these composite materials are susceptible to cracks due to external conditions. If the cracks form deep within the structure, detection is difficult and thus makes the repair normally impossible. These cracks affect the product's structural integrity. Since the damages deep inside materials are difficult to perceive and to repair in particular, the concept of an autonomic self-healing in a composite material is very much important, where the initiation of automatic repair is integral to the material.

Therefore, the research extensively focuses on the development of self-healing agents for composite structures. Self-healing of cracks in composite materials would contribute to a longer life of the same and would make the material not only more durable but also more sustainable.

The formation of microcrack is a critical problem in polymer composites which reduces the life time when the same is used in structural applications. Exposure to harsh environment leads to degradations of polymeric components and thus possibility of formation of microcracks. These microcracks significantly reduce the lifetime of the structures. In this context, the materials possessing self-healing function are ideal for long-lasting operation. Self-repairing polymers for polymer composites have attracted increasing research interests and attempts have been made to provide solutions in this field also.

U.S. Pat. No. 5,962,003 discloses a process for the preparation of polyurethane microcapsules containing monocrotophos. The process involves the usage of polyurethane as a wall material and the microencapsulation is conducted in two immiscible non aqueous phases at ambient temperatures.

U.S. Pat. No. 5,859,075 discloses a process for the manufacture of spherical polyurethane microspheres with controlled particle size and shape. The aforementioned document provides a process for the preparation of polyurethane mirospheres by directly using the corresponding monomers without the need for preparing any prepolymer and which can be carried out in a non-aqueous medium at low temperature.

U.S. Patent Publication No. 2006/0251688 discloses microcapsules containing biocide, useful for preparing coating materials such as interior and exterior paints. Microcapsules described in this invention are prepared by dispersing biocide in an aliphatic hydrocarbon medium containing nonionic polymeric stabilizer having hydrophilic and hydrophobic repeating units, diol or polyol having molecular weight in the range of 200-2000, crosslinker and a catalyst selected from amino or organometallic compounds; adding an isocyanate drop wise to this dispersion; agitating the mixture at 800-1000 rotations per minute for the first 3-5 hours at 40-50° C. and then at 12-15 hours at 20-27° C.; to permit the formation of polyurethane microcapsules; filtering and washing the microcapsules with lower aliphatic hydrocarbon and drying the microcapsules under vacuum at temperature between 20-35° C.

PCT International Publication No. 2015/074342 discloses a method for preparing an epoxy microcapsule by using polyurethane as a wall material comprise the following steps: preparing an endcapped-isocyanate polyurethane prepolymer; mixing the endcapped-isocyanate polyurethane prepolymer with epoxy resin, adding an emulsifier and water, stirring and performing an emulsification reaction to prepare an oil-in-water emulsion; heating and performing an interface reaction to form a capsule wall; and filtering, rinsing a precipitate by using water, and drying to obtain a microcapsule by using polyurethane as a wall material and using epoxy resin as a core material.

PCT International Publication No. 2014/194600 discloses an epoxy microcapsule with polyurea as a wall material, wherein the core material of the microcapsule comprises a liquid epoxy resin, and the wall material of the microcapsule is a crosslinked polyurea prepared by an interface reaction of polyisocyanate and water, the polyisocyanate comprising ternary or more than ternary polyisocyanate.

Article titled "Preparation and characterization of microcapsule containing epoxy resin and its self-healing performance of anticorrosion covering material" by LP Liao et al., published in *Chinese Science Bulletin*, 2011, 56 (4-5), pp 439-443, reports in situ encapsulation method for the preparation of urea-formaldehyde (UF) capsules filled with a healing agent, a mixture epoxy resin of the epoxy 711 and E-51. The capsules possess a uniform UF shell wall (4 μm average thickness). Successful self-healing has been demonstrated for anticorrosion covering materials with microcapsules.

As is evident from the foregoing, not only the microcapsule formulation but also the process of preparing the same is important when it comes to the durability such as thermal and mechanical stability and hence the associated properties and advantages when embedded in a composite structure. Therefore, the focus of research is currently on the development of composition of the capsules with durable properties to survive the mixing process and to release the healing agent as and when cracks appear in the hardened matrix.

In the light of the above, there remains a need in the art to provide a process for the preparation of self-healing microcapsules of epoxy resin which when embedded in composite structures releases the polymer forming material that can seal the cracks instantaneously.

OBJECTIVE OF THE INVENTION

The main objective of the present invention is to provide a process for the preparation of self-healing microcapsules containing epoxy resin comprising water-insoluble or water-soluble components or mixture thereof.

Another objective of the present invention is to provide a process for the preparation of self-healing microcapsules with epoxy or polyurethane as capsule wall material prepared by in-situ polymerization using non-aqueous continuous phase.

SUMMARY OF THE INVENTION

Accordingly, the present invention provides a process for the preparation of self-healing microcapsules with polyurethane as capsule wall material prepared by in-situ polymerization using non-aqueous continuous phase comprising the steps of:
 a) preparing a mixture of epoxy components to be encapsulated and polyisocyante;
 b) preparing a solution of diol or polyol with a cross-linker in aliphatic hydrocarbon;
 c) dispersing the mixture of step a) in a solution of a stabilizer and a catalyst in an aliphatic hydrocarbon;
 d) adding the solution of step (b) drop wise to the dispersion of step c) under agitation followed by treatment with anti-agglomerating agent to obtain microcapsules; and
 e) filtering and/or centrifuging, washing the microcapsules as obtained in step (d), with the aliphatic hydrocarbon and drying the microcapsules under vacuum at ambient temperature to obtain microcapsules with polyurethane as capsule wall material.

In yet another embodiment of the present invention, said polyisocyante is selected from aromatic polyisocyanates, aliphatic polyisocyanates, or mixtures thereof and said aromatic polyisocyanate is selected from the group consisting of 2,4- and 2,6-toluene diisocyanate (TDI), naphthalene diisocyanate, diphenyl methane diisocyanate, triphenyl methane-p,p'p"-trityltriisocyanate, polymethylene polyphenyleneisocyanate, 2,4,4'-diphenylether triisocyanate, 3,3'-dimethyl-4,4'-diphenyl diisocyanate, 3,3'-dimethoxy-4,4'diphenyl diisocyanate, triphenylmethane 4,4', 4" triisocyanate, and mixtures thereof and said aliphatic polyisocyanate is selected from the group consisting of dicyclohexylmethane 4,4'-diisocyanate, hexamethylene1,6-diisocyanate (HMDI), isophoronediisocyanate (IPDI), trimethyl-hexamethylene-diisocyanate, trimethylenediisocyanate, propylene-1,2-diisocyanate, butylene1,2-diisocyanate and mixtures thereof.

In yet another embodiment of the present invention, said diol or polyol is selected from ethyleneglycol, diethylene glycol, propylene glycol, 1,4-butane diol, 1,4 hexane diol, dipropylene glycol, cyclohexyl 1,4 dimethanol, 1,8 octane diol, 2,methyl 2,4 pentane diol (MPD), 1,3-propane diol, poly (ethylene glycols), poly (propylene glycols) or poly (tetra methylene glycols).

In yet another embodiment of the present invention, said cross-linker is selected from the group consisting of butane-1,2,3-triol, butane-1,2,4-triol, 2,2-dihydromethyl-1,3propane diol, castor oil, caprolactone-based triols, 2-hydroxy methyl-1,3-propane diol, trimethylol propane (TMP), trimethylol ethane (TME) and mixtures thereof.

In yet another embodiment of the present invention, said catalyst is selected from the group consisting of N, N' dimethylaminoethanol, N, N'-dimethylcyclohexylamine, bis [2-(N,N'dimethylamino)ethyl]ether, N,N'-dimethylacetylamine, diaminobicyclooctane, stannous octoate, dibutyltindilaurate (DBTDL) and mixtures thereof.

In yet another embodiment, present invention provides a process for the preparation of self-healing microcapsules with epoxy as capsule wall material prepared by in-situ polymerization using non-aqueous continuous phase comprising the steps of:
 a) dispersing epoxy components to be encapsulated in a solution of a stabilizer in an aliphatic hydrocarbon;
 b) preparing a solution of polyamine alone or optionally along with another polyamine in aliphatic hydrocarbon;
 c) adding solution prepared in step (b) drop wise to the dispersion of step a) under agitation followed by treatment with anti-agglomerating agent to obtain microcapsules; and
 d) filtering and/or centrifuging, washing the microcapsules, with the aliphatic hydrocarbon and drying the microcapsules under vacuum at ambient temperature to obtain microcapsules with epoxy as capsule wall material.

In yet another embodiment of the present invention, said stabilizer is selected from non-ionic polymeric surfactants having repeating hydrophilic and hydrophobic units, preferably polymeric non-ionic surfactant, more preferably with Hydrophilic Lipophilic Balance (HLB) between 4 and 13.

In yet another embodiment of the present invention, said epoxy component is water soluble and water insoluble and selected from the group consisting of diglycidyl ether of bisphenol A, diglycidyl ethers of bisphenol F, epoxy phenol novolacs (EPN), epoxy cresol novolacs (ECN), diglycidyl ether of butane diol (Butyl dioldiglycidyl ether), 3,4-epoxy-cyclohexylmethyl-3,4-epoxycyclohexane carboxylate, triglycidyl-p-aminophenol, N,N,N,N-tetraglycidyl-4,4-methylenebis benzylamine, 4-glycidyloxy-N,N-di-glycidyl aniline, 1.1.2.2-(p-hydroxyphenol) ethane based epoxy resin, ethylene glycol diglycidyl ether, diethylene glycol diglycidyl ether, polyethyleneglycol diglycidyl ether, propylene glycol diglycidyl ether and glycerol polyglycidyl ether.

In yet another embodiment of the present invention, said polyamine is selected from the group consisting of polyfunctional Aziridine PZ-33, PZ-28 (from Poly Aziridine L.L.C. NJ, USA), diethylenetriamine (DETA), triethylenetetraamine (TETA), tetraethylenepentamine, 2,4,4'-triaminodiphenylether, bis(hexamethylene) triamine, 1,4,5,8-tetraamino anthraquinone, ethylene diamine (EDA), trimethylenedipiperidine (TMDP), guanidine carbonate (GUCA), phenylenediamine, toluene diamine, pentamethylene hexamine, 1,6-hexamethylene diamine, 2,4-diamino-6-methyl-1,3,5 triazine 1,2-diaminocyclohexane, 4,4'-diaminodiphenylmethane, 1,5-diaminonaphthalene-isophoronediamine, diamino propane, diaminobutane and mixtures thereof.

In yet another embodiment of the present invention, said non-aqueous continuous medium for microencapsulation used as continuous phase may be selected from aliphatic hydrocarbon of the general formula $C_nH_{2n+2}$ where n can be between 6 to 16 and is selected from hexane, octane, decane, isooctane, dodecane, hexadecane, superior kerosene, paraffin oil, white mineral oil or suitable mixtures thereof.

In yet another embodiment of the present invention, microcapsules obtained have a particle size ranging from 1 to 100 microns.

BRIEF DESCRIPTION OF THE DRAWINGS

FIGS. 1(a)-1(d): Rupture test of microcapsules. FIG. 1(a): few mg of microcapsules were taken on slide; FIG. 1(b): one drop of hardener was added; FIG. 1(c): another slide was put on above slide and finger pressure was applied; FIG. 1(d): after 2 hours it was observed that slides cannot be separated.

FIG. 2(a) microcapsules prepared as per Example 1; FIG. 2(b) microcapsules prepared as per Example 4; FIG. 2(c) microcapsules prepared as per Example 5; FIG. 2(d) microcapsules prepared as per Example 6; FIG. 2(e) microcapsules prepared as per Example 11; FIG. 2(f) microcapsules prepared as per Example 13.

FIG. 3(a) microcapsules prepared as per Example 2; FIG. 3(b) microcapsules prepared as per Example 3.

DETAILED DESCRIPTION OF THE INVENTION

Figures 2A, 2B, 2C:
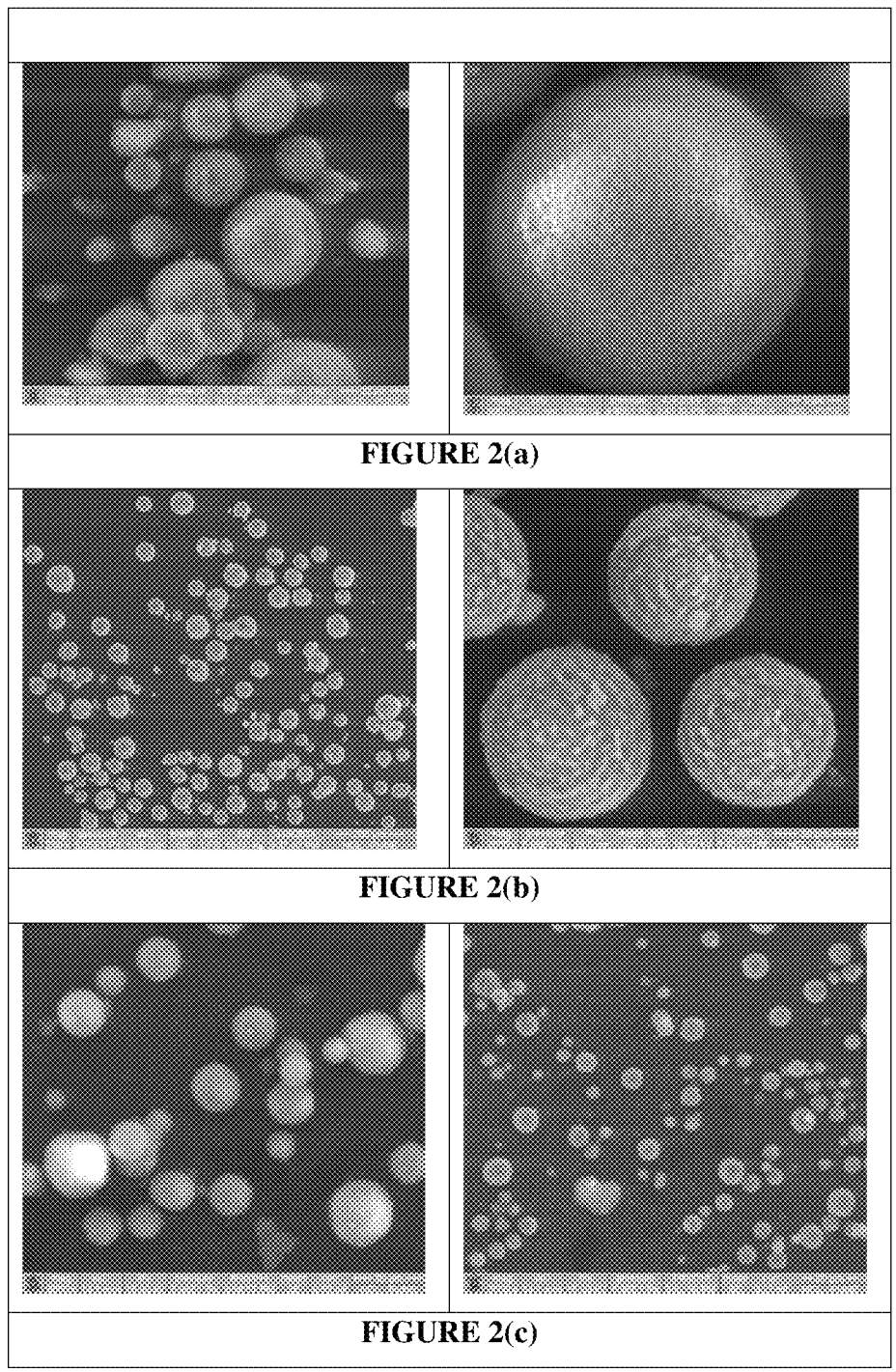
FIGS. 2(a)-2(f): SEM images of microcapsules.
Figure 2D:
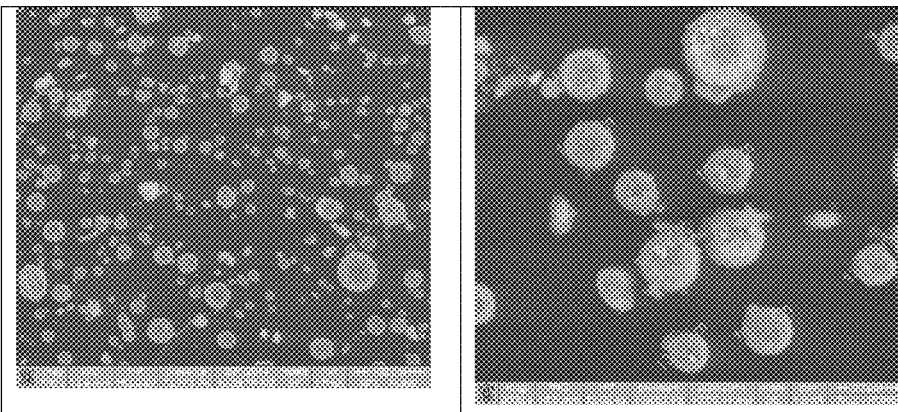
Figure 2E:
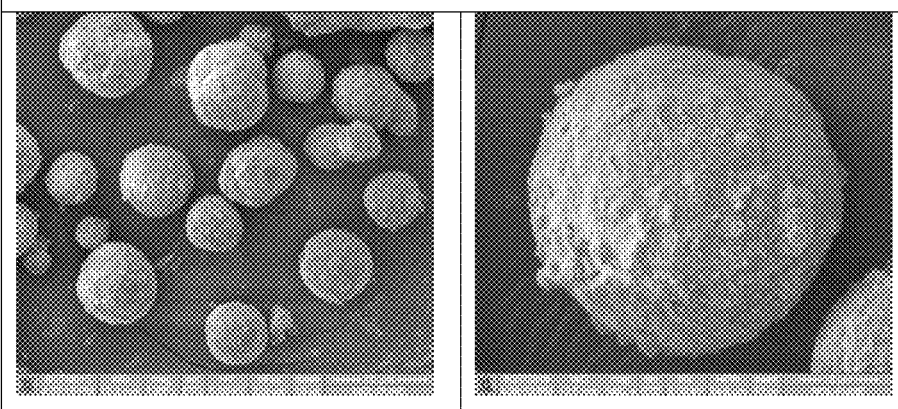
Figure 2F:
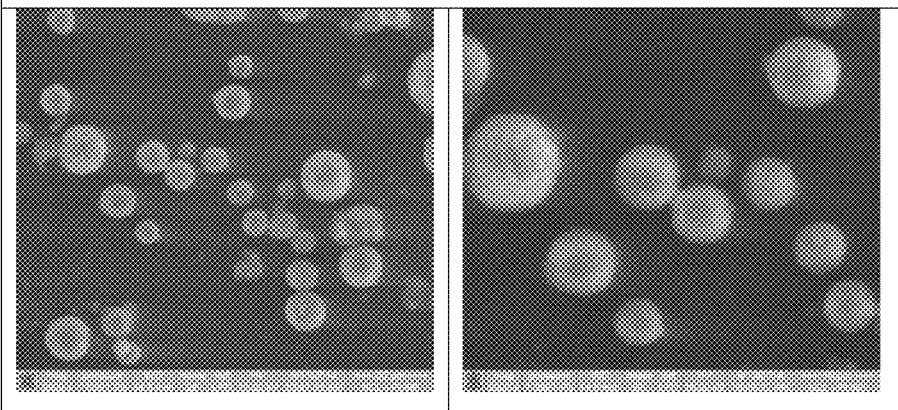

There are reports in the literature which describe micro-encapsulation of epoxy resin which is water-insoluble and hence aqueous continuous phase can be used for the preparation of the same. However as the epoxy formulation described herein contain water-soluble component, the processes described in the literature is not suitable and hence the instant invention proposes a novel process that suits the preparation of microcapsules containing water soluble components.

In the view of above, the instant invention provides a process for the preparation of microcapsules containing epoxy resin comprising water-insoluble and/or water-soluble components which acts as healing agents for the micro-cracks when embedded in composite structures.

The present invention provides a process for the preparation of self-healing microcapsules with polyurethane as capsule wall material prepared by in-situ polymerization using non-aqueous continuous phase comprising the steps of:
  a) preparing a mixture of water soluble and/or water insoluble epoxy components to be encapsulated and polyisocyante;
  b) preparing a solution of diol or polyol with a cross-linker in aliphatic hydrocarbon;
  c) dispersing the mixture of step a) in a solution of a stabilizer/surfactant and a catalyst selected from amino or organometallic compounds in an aliphatic hydrocarbon;
  d) adding the solution of step (b) drop wise to the dispersion of step c) under agitation followed by treatment with anti-agglomerating agent to obtain microcapsules; and
  e) filtering and/or centrifuging, washing the microcapsules, with the aliphatic hydrocarbon and drying the microcapsules under vacuum at ambient temperature.

Polyisocyante used is selected from aromatic polyisocyanates or aliphatic polyisocyanates, or mixtures thereof, wherein said aromatic polyisocyanate is selected from the group consisting of 2,4- and 2,6-toluene diisocyanate (TDI), naphthalene diisocyanate, diphenyl methane diisocyanate, triphenyl methane-p,p'p"-trityltriisocyanate, polymethylene polyphenyleneisocyanate, 2,4,4'-diphenylether triisocyanate, 3,3'-dimethyl-4,4'-diphenyl diisocyanate, 3,3'-dimethoxy-4,4'diphenyl diisocyanate, triphenylmethane 4,4', 4" triisocyanate, and mixtures thereof and said aliphatic polyisocyanate is selected from the group consisting of dicyclohexylmethane 4,4'-diisocyanate, hexamethylene1,6-diisocyanate (HMDI), isophoronediisocyanate (IPDI), trimethylhexamethylenediisocyanate, trimethylenediisocyanate, propylene-1,2-diisocyanate, butylene1,2-diisocyanate, and mixtures thereof.

Diol or polyol used is selected from the group consisting of ethyleneglycol, diethylene glycol, propylene glycol, 1,4-butane diol, 1,4 hexane diol, dipropylene glycol, cyclohexyl 1,4 dimethanol, 1,8 octane diol, 2,methyl 2,4 pentane diol (MPD), 1,3-propane diol, poly (ethylene glycols), poly (propylene glycols) or poly(tetra methylene glycols).

Cross-linker used is selected from butane-1,2,3-triol, butane-1,2,4-triol, 2,2-dihydromethyl-1,3propane diol, castor oil, caprolactone-based triols, 2-hydroxy methyl-1,3-propane diol, trimethylol propane (TMP), trimethylol ethane (TME) and mixtures thereof.

Catalyst used is N, N' dimethylaminoethanol, N, N'-dimethylcyclohexylamine, bis[2-(N,N' dimethylamino) ethyl] ether, N, N'-dimethylacetylamine, diaminobicyclooctane, stannous octoate, dibutyltindilaurate (DBTDL) and mixtures thereof.

The present invention provides a process for the preparation of self-healing microcapsules with epoxy as capsule wall material prepared by in-situ polymerization using non-aqueous continuous phase comprising the steps of:
  a) dispersing water soluble and/or water insoluble epoxy components to be encapsulated in a solution of a stabilizer in an aliphatic hydrocarbon;
  b) preparing a solution of polyamine alone or optionally along with another polyamine in aliphatic hydrocarbon;
  c) adding solution prepared in step (b) drop wise to the dispersion of step a) under agitation followed by treatment with anti-agglomerating agent to obtain microcapsules; and
  d) filtering and/or centrifuging, washing the microcapsules, with the aliphatic hydrocarbon and drying the microcapsules under vacuum at ambient temperature.

Stabilizer used is selected from non-ionic polymeric surfactants having repeating hydrophilic and hydrophobic units such as polymeric non-ionic surfactant, preferably with Hydrophilic Lipophilic Balance (HLB) between 4 and 13.

Epoxy component used is water soluble and water insoluble and selected from diglycidyl ether of bisphenol A, diglycidyl ethers of bisphenol F, epoxy phenol novolacs (EPN), epoxy cresol novolacs (ECN), diglycidyl ether of butane diol (Butyl dioldiglycidyl ether), 3,4-epoxycyclohexylmethyl-3,4-epoxycyclohexane carboxylate, triglycidyl-p-aminophenol, N,N,N,N-tetraglycidyl-4,4-methylenebis benzylamine, 4-glycidyloxy-N,N-di-glycidyl aniline, 1.1.2.2-(p-hydroxyphenol) ethane based epoxy resin, ethylene glycol diglycidyl ether, diethylene glycol diglycidyl ether, polyethyleneglycol diglycidyl ether, propylene glycol diglycidyl ether or glycerol polyglycidyl ether.

Polyamine used is selected from polyfunctional Aziridine PZ-33, PZ-28 (from Poly Aziridine L.L.C. NJ, USA), diethylenetriamine (DETA), triethylenetetraamine (TETA), tetraethylenepentamine, 2,4,4'-triaminodiphenylether, bis(hexamethylene) triamine, 1,4,5,8-tetraamino anthraquinone, ethylene diamine (EDA), trimethylenedipiperidine (TMDP), guanidine carbonate (GUCA), phenylenediamine, toluene diamine, pentamethylene hexamine, 1,6-hexamethylene diamine, 2,4-diamino-6-methyl-1,3,5 triazine 1,2-diaminocyclohexane, 4,4'-diaminodiphenylmethane, 1,5-diaminonaphthalene-isophoronediamine, diamino propane, diaminobutane and mixtures thereof.

Non-aqueous continuous medium for microencapsulation used as continuous phase may be selected from aliphatic hydrocarbon of the general formula $C_nH_{2n+2}$ where n can be between 6 to 16 and is selected from hexane, octane, decane, isooctane, dodecane, hexadecane, superior kerosene, paraffin oil, white mineral oil or suitable mixtures thereof.

The microcapsules of the invention thus obtained have a particle size ranging from 1 to 100 microns.

The instant invention provides self-healing microcapsules of epoxy comprising water-insoluble and/or water-soluble components prepared by in-situ polymerization using non-aqueous continuous phase.

To check if microcapsules containing epoxy resin break with pressure characterization experiment is carried out. Few mg of microcapsules from Example 1 containing mixture of water insoluble and soluble epoxy resin were taken on microscope glass slide along with few mg of hardener. Another glass slide was kept on this microcapsule-hardener mixture and gently pressure was applied on the top slide. It was noted that epoxy from microcapsules flows out and gets set in presence of hardener. These two slides are found to stick to each other firmly (FIG. 1(a-d)). This experiment indicates that microcapsules get ruptured with pressure and epoxy resin from microcapsules comes out.

Figure 3A:
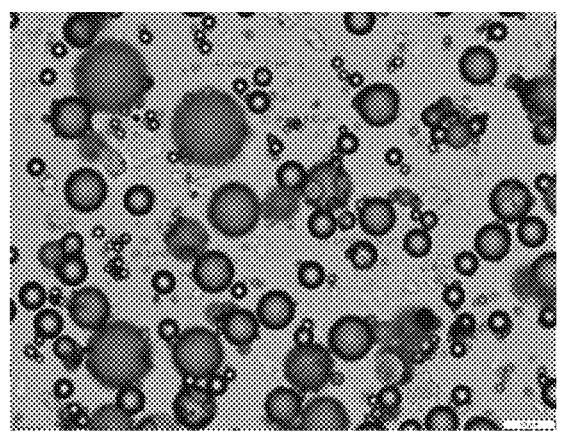
FIGS. 3(a)-3(b): Optical images of microcapsules.
Figure 3B:
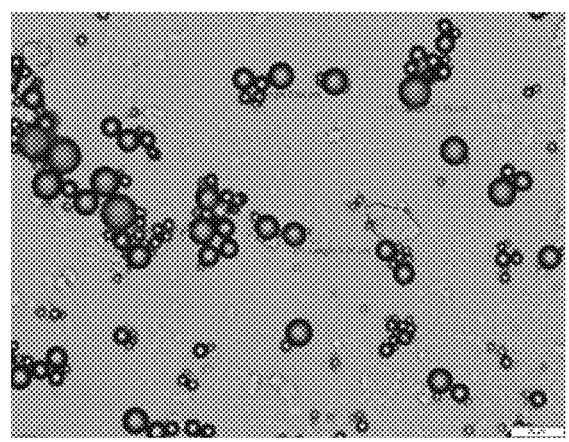

The microcapsules prepared as exemplified herein are characterized by Scanning Electron Microphotographs (SEM) (FIG. 2(a-f)) and Optical images (FIG. 3(a-b)).

EXAMPLES

Following examples are given by way of illustration therefore should not be construed to limit the scope of the invention.

Example 1

Preparation of Microcapsules Containing Mixture of Water Soluble and Insoluble Epoxy Resin Using Polyurethane as Capsule Wall Material:

In 250 ml beaker, 20 mg of Hypermer A70 and 0.5 gm of 1% dibutyltindilaurate (DBTDL) in paraffin oil were dissolved in 50 gm of paraffin oil. Beaker was assembled with overhead stirrer and reaction mixture was stirred at 500 rpm. Then 4.79 gm of IPDI was dissolved in 6 gm of epoxy resin mixture. This solution was added into the reaction mixture and stirred for 15 min to stabilize the emulsion. Then 1 gm of ethylene glycol and 0.2 gm of trimethylol propane in 3 gm paraffin oil was added in reaction mixture drop wise over the period of 14 minutes. Reaction mixture was then stirred for 30 minute at 40° C. and then 30 minute at 50° C. Thereafter temperature was raised to 60° C. and stirred for further 4 hours. Then the reaction temperature was brought to 35° C. and kept for overnight. After stirring for 23 hours, 90 ml pet ether was added and was stirred for 30 minutes. After the completion of reaction, mixture was centrifuged at 3000 rpm for 2 minutes and washed with pet ether.

Finally microcapsules were dispersed in 50 ml pet ether and 1.2 gm of nano silica was added. This dispersion was then poured into Petri-dish and allowed to evaporate in air. Obtained microcapsules were dried in air for overnight (15 hr). The epoxy microcapsules have size range of 2-75 microns, of which majority of capsules were 10-25 microns. The Yield of the epoxy microcapsules obtained was 72%.

Example 2

Preparation of Microcapsules Containing Water-Insoluble Epoxy Resin and Epoxy as Capsule Wall Material:

In 250 ml beaker, 40 mg of Hypermer A70 was dissolved in 50 gm of paraffin oil. Beaker was assembled with overhead stirrer and reaction mixture was stirred at 500 rpm. Then 9.26 gm of water-insoluble epoxy resin (diglycidyl ether of bisphenol A) was added and stirred for 20 minute to stabilize the emulsion. Then 0.5 gm diethylene triamine (DETA) in 3 gm paraffin oil was added in reaction mixture drop wise over the period of 12 minutes. Reaction mixture was then stirred for 30 minute at 40° C. and then 30 minute at 50° C. Thereafter temperature was raised to 60° C. and stirred for further 4 hours. Then the reaction temperature was brought to 35° C. and kept for overnight. After stirring for 23 hours, 90 ml pet ether was added and was stirred for 30 minutes. After the completion of reaction, mixture was filtered by water suction pump and washed with pet ether.

Finally microcapsules were dispersed in 50 ml pet ether and 0.8 gm of nano silica was added. This dispersion was then poured into Petri-dish and allowed to evaporate in air. Obtained microcapsules were dried in air for overnight (15 hr). The epoxy microcapsules have size range of 5-60 microns, of which majority of capsules were 10-30 microns. The Yield of the epoxy microcapsules obtained was 84%.

Example 3

Preparation of Microcapsules Containing Water-Soluble Epoxy Resin and Epoxy as Capsule Wall Material:

In 250 ml beaker, 40 mg of Hypermer A70 was dissolved in 50 gm of paraffin oil. Beaker was assembled with overhead stirrer and reaction mixture was stirred at 500 rpm. Then 4.52 gm of water-soluble epoxy (diglycidyl ether of butane diol) was added and stirred for 20 minute to stabilize the emulsion. Then 0.5 gm diethylene triamine (DETA) in 5 gm paraffin oil was added in reaction mixture drop wise over the period of 10 minutes. Reaction mixture was then stirred for 30 minute at 40° C. and then 30 minute at 50° C. Thereafter temperature was raised to 60° C. and stirred for further 4 hours. Then the reaction temperature was brought to 35° C. and kept for overnight. After stirring for 23 hours, 90 ml pet ether was added and was stirred for 30 minutes. After the completion of reaction, mixture was centrifuged at 3000 rpm for 2 minutes and washed with pet ether.

Finally microcapsules were dispersed in 50 ml pet ether and 0.51 gm of nano silica was added. This dispersion was then poured into Petri-dish and allowed to evaporate in air. Obtained microcapsules were dried in air for overnight (15 hr). The epoxy microcapsules have size range of 2-50 microns, of which majority of capsules were 2-10 microns. The Yield of the epoxy microcapsules obtained was 87%.

Example 4

Preparation of Microcapsules Containing Mixture of Water Soluble and Insoluble Epoxy Resin Using Polyurethane as Capsule Wall Material:

In 250 ml beaker, 20 mg of Hypermer A70 and 0.5 gm of 1% DBTDL in paraffin oil were dissolved in 50 gm of paraffin oil. Beaker was assembled with overhead stirrer and reaction mixture was stirred at 500 rpm. Then 3.63 gm of hexamethylene1,6-diisocyanate (HMDI) was dissolved in 4.8 gm of epoxy resin mixture. This solution was added into the reaction mixture and stirred for 15 min to stabilize the emulsion. Then 1 gm of ethylene glycol and 0.2 gm of trimethylol propane in 3 gm paraffin oil was added in reaction mixture drop wise over the period of 15 minutes. Reaction mixture was then stirred for 30 minute at 40° C. and then 30 minute at 50° C. Thereafter temperature was raised to 60° C. and after 2 hours 20 mg of Hypermer A70 in 2 gm paraffin oil was added. Mixture was stirred for further 2 hours. Then the reaction temperature was brought to 35° C. and kept for overnight. After stirring for 23 hours, 90 ml pet ether was added and was stirred for 30 minutes. After the completion of reaction, mixture was centrifuged at 3000 rpm for 2 minutes and washed with pet ether.

Finally microcapsules were dispersed in 50 ml pet ether and 0.5 gm of nano silica was added. This dispersion was then poured into Petri-dish and allowed to evaporate in air. Obtained microcapsules were dried in air for overnight (15 hr). The epoxy microcapsules have size range of 5-75 microns, of which majority of capsules were 25-50 microns. The Yield of the epoxy microcapsules obtained was 70%.

Example 5

Preparation of Microcapsules Containing Mixture of Water Soluble and Insoluble Epoxy Resin Using Polyurethane as Capsule Wall Material:

In 250 ml beaker, 20 mg of A70 Hypermer and 0.5 gm of 1% dibutyltin dilaurate (DBTDL) were dissolved in 50 gm of paraffin oil. The beaker was assembled with overhead stirrer and reaction mixture was stirred at 500 rpm. Then 2.32 gm of IPDI was dissolved in 3.52 gm of mixture of water soluble and insoluble epoxy resin. This solution was added into the reaction mixture and stirred for 15 min to stabilize the emulsion. Then 1 gm of ethyl hexyl glycol and 0.2 gm of trimethylol propane in 3 gm paraffin oil was added in reaction mixture drop wise over the period of 13 minutes (0.3-0.5 g/min). Reaction mixture was then stirred for 30 minutes at 40° C. and then 30 minutes at 50° C. Thereafter temperature was raised to 60° C. and stirred for further 4 hours. Then the reaction temperature was brought to 35° C. and kept for overnight. After the stirring of 22 hours, 90 ml pet ether was added and was stirred for 30 minutes. After the completion of reaction, mixture was centrifuged at 3500 rpm for 3 minutes and washed with pet ether.

Finally microcapsule was dispersed in 50 ml pet ether and 0.7 gm of nano silica was added. This dispersion was then poured into Petri-dish and allowed to evaporate in air. Obtained microcapsules were dried in air for overnight (15 hr).

The epoxy microcapsules have size range of 2-55 microns, of which majority of capsules were 10-15 microns. The Yield of the epoxy microcapsule obtained was 84%.

Example 6

Preparation of Microcapsules Containing Mixture of Water Soluble and Insoluble Epoxy Resin Using Polyurethane as Capsule Wall Material:

In 250 ml beaker, 20 mg of A70 Hypermer and 0.5 gm of 1% dibutyltin dilaurate (DBTDL) were dissolved in 50 gm of paraffin oil. The beaker was assembled with overhead stirrer and reaction mixture was stirred at 500 rpm. Then 1.81 gm of TDI was dissolved in 3.02 gm of mixture of water soluble and insoluble epoxy resin. This solution was added into the reaction mixture and stirred for 15 min to stabilize the emulsion. Then 1 gm of ethyl hexyl glycol and 0.2 gm of trimethylol propane in 3 gm paraffin oil was added drop wise in reaction mixture over the period of 15 minutes (0.28-0.5 g/min). Reaction mixture was then stirred for 30 minutes at 40° C. and then 30 minutes at 50° C. Thereafter temperature was raised to 60° C. and stirred for further 4 hours. Then the reaction temperature was brought to 35° C. followed by addition of 0.2 gm of fumed silica and kept for overnight. After the stirring of 22 hours 0.1 gm fumed silica added and stirring continued for further 1 hour, then 90 ml pet ether was added and stirred for next 30 minutes. After the completion of reaction, mixture was filtered and washed with pet ether.

Finally microcapsule was dispersed in 50 ml pet ether and 0.07 gm of nano silica was added. This dispersion was then poured into Petri-dish and allowed to evaporate in air. Obtained microcapsules were dried in air for overnight (15 hr). The epoxy microcapsules have size range of 10-60 microns. The Yield of the epoxy microcapsule obtained was 79%.

Example 7

Preparation of Microcapsules Containing Mixture of Water Soluble and Insoluble Epoxy Resin Using Polyurethane as Capsule Wall Material:

In 250 ml beaker, 20 mg of A70 Hypermer and 0.5 gm of 1% dibutyltin dilaurate (DBTDL) were dissolved in 50 gm of paraffin oil. The beaker was assembled with overhead stirrer and reaction mixture was stirred at 500 rpm. Then 3.76 gm of TDI was dissolved in 4.96 gm of mixture of water soluble and insoluble epoxy resin. This solution was added into the reaction mixture and stirred for 20 min to stabilize the emulsion. Then 1 gm of ethylene glycol and 0.2 gm of trimethylol propane in 3 gm paraffin oil was added drop wise in reaction mixture over the period of 15 minutes (0.28-0.5 g/min). Reaction mixture was then stirred for 30 minutes at 40° C. and then 30 minutes at 50° C. Thereafter temperature was raised to 60° C. and stirred for further 4 hours. Then the reaction temperature was brought to 35° C. and kept for overnight followed by addition of 0.3 gm fumed silica. After the stirring of 22 hours 0.3 gm fumed silica added and stirred for further one hour, then 90 ml pet ether was added and was stirred for 30 minutes. After the completion of reaction, mixture was centrifuged at 4000 rpm for 5 minutes and washed with pet ether.

Finally microcapsule was dispersed in 50 ml pet ether and 10% (w.r.t. theoretical yield) nano silica was added. This dispersion was then poured into Petri-dish and allowed to evaporate in air. Obtained microcapsules were dried in air for overnight (15 hr). The epoxy microcapsules have size range of 5-45 microns, of which majority of capsules were 10-30 microns. The Yield of the epoxy microcapsule obtained was 85%.

Example 8

Preparation of Microcapsules Containing Mixture of Water Soluble and Insoluble Epoxy Resin Using Polyurethane as Capsule Wall Material:

In 250 ml beaker, 15 mg of A70 Hypermer and 0.5 gm of 1% dibutyltin dilaurate (DBTDL) were dissolved in 50 gm of paraffin oil. The beaker was assembled with overhead stirrer and reaction mixture was stirred at 500 rpm. Then 2.6 gm HMDI was dissolved in 3.8 gm of mixture of water soluble and insoluble epoxy resin. This solution was added into the reaction mixture and stirred for 20 min to stabilize the emulsion. Then 1 gm of butane diol and 0.2 gm of trimethylol propane in 3 gm paraffin oil was added drop wise in reaction mixture over the period of 10 minutes (0.4-0.5 g/min). Reaction mixture was then stirred for 30 minutes at 40° C. and then 30 minutes at 50° C. Thereafter temperature was raised to 60° C. and stirred for further 4 hours. Then the reaction temperature was brought to 35° C. and kept for overnight. After the stirring of 23 hours, 90 ml pet ether was added and was stirred for 30 minutes. After the completion of reaction, mixture was filtered out and washed with pet ether.

Finally microcapsule was dispersed in 30 ml pet ether and 0.76 gm of nano silica was added. This dispersion was then poured into Petri-dish and allowed to evaporate in air. Obtained microcapsules were dried in air for overnight (15 hr). The epoxy microcapsules have size range of 2-70 microns, of which majority of capsules were 15-60 microns. The Yield of the epoxy microcapsule obtained was 83%.

Example 9

Preparation of Microcapsules Containing Water Soluble Epoxy Resin Using Epoxy as Capsule Wall Material:

In 250 ml beaker, 40 mg of A70 Hypermer was dissolved in 50 gm of paraffin oil. The beaker was assembled with overhead stirrer and reaction mixture was stirred at 500 rpm. Then 6.94 gm water soluble epoxy was added and stirred for 10 minute to stabilize the emulsion. Then 0.5 gm of EDA and 0.1 gm triethylene tetraamine (TETA) as crosslinker (20% w.r.t EDA) was dissolved in 3 gm of paraffin oil. This solution was added into the reaction mixture drop wise over the period of 12 minutes (0.35-0.5 g/min). Reaction mixture was then stirred for 30 minutes at 40° C. and then 30 minutes at 50° C. Thereafter temperature was raised to 60° C. and stirred for further 4 hours. Then the reaction temperature was brought to 35° C. and kept for overnight (15 hr). After the stirring of 22 hours, 90 ml pet ether was added and stirred for 30 minutes. After the completion of reaction, mixture was filtered out washed with pet ether.

Finally microcapsule was dispersed in pet ether and 0.76 gm of nano silica was added. This dispersion was then poured into Petri-dish and allowed to evaporate in air. Obtained microcapsules were dried in air for overnight (15 hr). The epoxy microcapsules have size range of 1-50 microns, of which majority of capsules were 5-15 microns. The Yield of the epoxy microcapsule obtained was 80%.

Example 10

Preparation of Microcapsules Containing Water Insoluble Epoxy Resin and Epoxy as Capsule Wall Material:

In 250 ml beaker, 40 mg of A70 Hypermer was dissolved in 50 gm of paraffin oil. Beaker was assembled with overhead stirrer and reaction mixture was stirred at 500 rpm. Then 8.18 gm of water insoluble epoxy was added and stirred for 20 minute to stabilize the emulsion. Then 0.5 gm triethylene tetraamine (TETA) dissolved in 3 gm paraffin oil and added drop wise in reaction mixture over the period of 5 minutes (0.7-0.9 g/min). Reaction mixture was then stirred for 30 minutes at 40° C. and then 30 minutes at 50° C. Thereafter temperature was raised to 60° C. and stirred for further 4 hours. Then the reaction temperature was brought to 35° C. and kept for overnight. After the stirring of 22 hours, 90 ml pet ether was added and stirred for 30 minutes. After the completion of reaction, mixture was centrifuged for 2 minutes and washed with pet ether. Obtained microcapsules were dried in air for overnight (15 hr). The epoxy microcapsules have size range of 2-100 microns, of which majority of capsules were 2-50 microns. The Yield of the epoxy microcapsules obtained was 92%.

Example 11

Preparation of Microcapsules Containing Water Insoluble Epoxy Resin Using Polyurethane as Capsule Wall Material:

In 250 ml beaker, 10 mg of A70 Hypermer and 0.5 gm of 1% dibutyltin dilaurate (DBTDL) were dissolved in 50 gm of paraffin oil. The beaker was assembled with overhead stirrer and reaction mixture was stirred at 500 rpm. Then 2.6 gm HMDI was dissolved in 3.8 gm of water insoluble epoxy. This solution was added into the reaction mixture and stirred for 15 min to stabilize the emulsion. Then 1 gm of butane diol and 0.2 gm of trimethylol propane (as a crosslinker) dissolved in 3 gm paraffin oil and added drop wise in reaction mixture over the period of 14 minutes (0.28-0.4 g/min). Reaction mixture was then stirred for 30 minutes at 40° C. and then 30 minutes at 50° C. Thereafter temperature was raised to 60° C. and stirred for further 4 hours. Then the reaction temperature was brought to 35° C. and kept for overnight. After the stirring of 23 hours, 90 ml pet ether was added and stirred for 30 minutes. After the completion of reaction, mixture was filtered out and washed with pet ether.

Finally microcapsule was dispersed in 30 ml pet ether and 0.38 gm of nano silica was added. This dispersion was then poured into Petri-dish and allowed to evaporate in air. Obtained microcapsules were dried in air for overnight (15 hr). The epoxy microcapsules have size range of 2-75 microns, of which majority of capsules were 10-25 microns. The Yield of the epoxy microcapsule obtained was 87%.

Example 12

Preparation of Microcapsules Containing Water Soluble Epoxy Resin Using Polyurethane as Capsule Wall Material:

In 250 ml beaker, 20 mg of A70 Hypermer and 0.5 gm of 1% dibutyltin dilaurate (DBTDL) were dissolved in 50 gm of paraffin oil. The beaker was assembled with overhead stirrer and reaction mixture was stirred at 500 rpm. Then 2.6 gm HMDI was dissolved in 3.8 gm of water soluble epoxy. This solution was added into the reaction mixture and stirred for 20 min to stabilize the emulsion. Then 1 gm of butane diol and 0.2 gm of trimethylol propane (as a crosslinker) dissolved in 3 gm paraffin oil then added drop wise in reaction mixture over the period of 10 minutes (0.4-0.6 g/min). Reaction mixture was then stirred for 30 minutes at 40° C. and then 30 minutes at 50° C. Thereafter temperature was raised to 60° C. and stirred for further 4 hours. Then the reaction temperature was brought to 35° C. and kept for overnight. After the stirring of 23 hours 0.3 gm fumed silica was added and stirred for 1 hour, after that 90 ml pet ether was added and stirred for 30 minutes. After the completion of reaction, mixture was filtered out and microcapsules were washed with pet ether.

Finally microcapsule was dispersed in 40 ml pet ether and 0.3 gm of fumed silica was added. This dispersion was then poured into Petri-dish and allowed to evaporate in air. Obtained microcapsules were dried in air for overnight (15 hr). The epoxy microcapsules have size range of 5-40 microns, of which majority of capsules were 15-25 microns. The Yield of the epoxy microcapsule obtained was 74%.

Example 13

Preparation of Microcapsules Containing Mixture of Water Soluble and Insoluble Epoxy Resin Using Polyurethane as Capsule Wall Material:

In 250 ml beaker, 20 mg of A70 Hypermer and 0.5 gm of 1% dibutyltin dilaurate (DBTDL) were dissolved in 50 gm of paraffin oil. The beaker was assembled with overhead stirrer and reaction mixture was stirred at 500 rpm. Then 3.48 gm of IPDI was dissolved in 4.68 gm of mixture water soluble and insoluble epoxy resin. This solution was added into the reaction mixture and stirred for 20 min to stabilize the emulsion. Then 1 gm of butane diol and 0.2 gm of trimethylol propane dissolved in 3 gm paraffin oil was added drop wise in reaction mixture over the period of 13 minutes (0.28-0.5 g/min). Reaction mixture was then stirred for 30 minutes at 40° C. and then 30 minutes at 50° C. Thereafter temperature was raised to 60° C. and stirred for further 4 hours. Then the reaction temperature was brought to 35° C. and kept for overnight. After the stirring of 23 hours 90 ml pet ether was added and stirred for 20 minutes. After the completion of reaction, mixture was centrifuged at 3000 rpm four times by 3 minutes interval and washed with pet ether.

Finally microcapsule was dispersed in 60 ml pet ether and 0.9 gm nano silica was added. This dispersion was then poured into Petri-dish and allowed to evaporate in air. Obtained microcapsules were dried in air for overnight (15 hr). The epoxy microcapsules have size range of 5-75 micron of which majority of capsules were 10-20 microns. The Yield of the epoxy microcapsule obtained was 67%.

Example 14

Characterization of Microcapsules (Rupture of Microcapsules with Pressure)

To check if microcapsules containing epoxy resin break with pressure following experiment was carried out. Few mg of microcapsules from Example 1 containing mixture of water insoluble and soluble epoxy resin were taken on microscope glass slide along with few mg of hardener. Another glass slide was kept on this microcapsule-hardener mixture and gently pressure was applied on the top slide. It was noted that epoxy from microcapsules flows out and gets set in presence of hardener. These two slides were found to stick to each other firmly. This experiment indicates that microcapsules get ruptured with pressure and epoxy resin from microcapsules comes out.

The microcapsules prepared as exemplified herein were characterized by Scanning Electron Microphotographs (SEM), refer FIG. 2 and Optical images, refer FIG. 3.

ADVANTAGES OF THE INVENTION

Simple process of preparation
The self-healing microcapsules of epoxy resin when embedded in composite structures releases the polymer forming material when crack is developed and that can seal the cracks instantaneously.
The process described can produce microcapsules containing not only water-insoluble epoxy resin but water-soluble epoxy resin too.

What is claimed is:

1. A process for the preparation of self-healing microcapsules with polyurethane as capsule wall material prepared by in-situ polymerization using non-aqueous continuous phase comprising the steps of:
    a) preparing a mixture of epoxy components to be encapsulated and polyisocyante;
    b) preparing a solution of diol or polyol with a cross-linker in aliphatic hydrocarbon;
    c) dispersing the mixture of step a) in a solution of a stabilizer and a catalyst in an aliphatic hydrocarbon;
    d) adding the solution of step (b) drop wise to the dispersion of step c) under agitation followed by treatment with anti-agglomerating agent to obtain microcapsules; and
    e) filtering and/or centrifuging, washing the microcapsules as obtained in step (d), with the aliphatic hydrocarbon and drying the microcapsules under vacuum at ambient temperature to obtain microcapsules with polyurethane as capsule wall material.

2. The process as claimed in claim 1, wherein said polyisocyante is selected from aromatic polyisocyanates, aliphatic polyisocyanates, or mixtures thereof and said aromatic polyisocyanate is selected from the group consisting of 2,4- and 2,6-toluene diisocyanate (TDI), naphthalene diisocyanate, diphenyl methane diisocyanate, triphenyl methane-p,p'p"-trityltriisocyanate, polymethylene polyphenyleneisocyanate, 2,4,4'-diphenylether triisocyanate, 3,3'-dimethyl-4,4'-diphenyl diisocyanate, 3,3'-dimethoxy-4,4'diphenyl diisocyanate, triphenylmethane 4,4', 4" triisocyanate, and mixtures thereof and said aliphatic polyisocyanate is selected from the group consisting of dicyclohexylmethane 4,4'-diisocyanate, hexamethylene1,6-diisocyanate (HMDI), isophoronediisocyanate (IPDI), trimethyl-hexamethylene-diisocyanate, trimethylenediisocyanate, propylene-1,2-diisocyanate, butylene1,2-diisocyanate and mixtures thereof.

3. The process as claimed in claim 1, wherein said diol or polyol is selected from ethylene glycol, diethylene glycol, propylene glycol, 1,4-butane diol, 1,4 hexane diol, dipropylene glycol, cyclohexyl 1,4 dimethanol, 1,8 octane diol, 2,methyl 2,4 pentane diol (MPD), 1,3-propane diol, poly (ethylene glycols), poly (propylene glycols) or poly(tetra methylene glycols).

4. The process as claimed in claim 1, wherein said cross-linker is selected from the group consisting of butane-1,2,3-triol, butane-1,2,4-triol, 2,2-dihydromethyl-1,3propane diol, castor oil, caprolactone-based triols, 2-hydroxy methyl-1,3-propane diol, trimethylol propane (TMP), trimethylol ethane (TME) and mixtures thereof.

5. The process as claimed in claim 1, wherein said catalyst is selected from the group consisting of N, N' dimethylaminoethanol, N, N'-dimethylcyclohexylamine, bis[2-(N,N'dimethylamino)ethyl]ether, N,N'-dimethylacetylamine, diaminobicyclooctane, stannous octoate, dibutyltindilaurate (DBTDL) and mixtures thereof.

6. A process for the preparation of self-healing microcapsules with epoxy as capsule wall material prepared by in-situ polymerization using non-aqueous continuous phase comprising the steps of:
    a) dispersing epoxy components to be encapsulated in a solution of a stabilizer in an aliphatic hydrocarbon;
    b) preparing a solution of polyamine alone or optionally along with another polyamine in aliphatic hydrocarbon;
    c) adding solution prepared in step (b) drop wise to the dispersion of step (a) under agitation followed by treatment with anti-agglomerating agent to obtain microcapsules; and
    d) filtering and/or centrifuging, washing the microcapsules, with the aliphatic hydrocarbon and drying the microcapsules under vacuum at ambient temperature to obtain microcapsules with epoxy as capsule wall material.

7. The process as claimed in claim 1 or 6, wherein said stabilizer is selected from non-ionic polymeric surfactants having repeating hydrophilic and hydrophobic units, preferably polymeric non-ionic surfactant, more preferably Hydrophilic Lipophilic Balance (HLB) between 4 and 13.

8. The process as claimed in claim 1 or 6, wherein said epoxy component is selected from the group consisting of diglycidyl ether of bisphenol A, diglycidyl ethers of bisphenol F, epoxy phenol novolacs (EPN), epoxy cresol novolacs (ECN), diglycidyl ether of butane diol(Butyl dioldiglycidyl ether), 3,4-epoxycyclohexylmethyl-3,4-epoxycyclohexane carboxylate, triglycidyl-p-aminophenol, N,N,N,N-tetraglycidyl-4,4-methylenebis benzylamine, 4-glycidyloxy-N,N-di-glycidyl aniline, 1.1.2.2-(p-hydroxyphenol) ethane based epoxy resin, ethylene glycol diglycidyl ether, diethylene glycol diglycidyl ether, polyethyleneglycol diglycidyl ether, propylene glycol diglycidyl ether and glycerol polyglycidyl ether.

9. The process as claimed in claim 6, wherein said polyamine is selected from the group consisting of polyfunctional Aziridine PZ-33, PZ-28 (from Poly Aziridine L.L.C. NJ, USA), diethylenetriamine (DETA), triethylenetetraamine (TETA), tetraethylenepentamine, 2,4,4'-triaminodiphenylether, bis(hexamethylene) triamine, 1,4,5,8-tetraamino anthraquinone, ethylene diamine (EDA), trimethylenedipiperidine (TMDP), guanidine carbonate (GUCA), phenylenediamine, toluene diamine, pentamethylene hexamine, 1,6-hexamethylene diamine, 2,4-diamino-6-methyl-1,3,5 triazine 1,2-diaminocyclohexane, 4,4'-diaminodiphenylmethane, 1,5-diaminonaphthalene-isophoronediamine, diamino propane, diaminobutane and mixtures thereof.

10. The process as claimed in claim 1 or 6, wherein said non-aqueous continuous medium for microencapsulation used as continuous phase may be selected from aliphatic hydrocarbon of the general formula $C_nH_{2n+2}$ where n can be between 6 to 16 and is selected from hexane, octane, decane, isooctane, dodecane, hexadecane, superior kerosene, paraffin oil, white mineral oil or suitable mixtures thereof.

* * * * *